US011410679B2

(12) United States Patent
Hwang et al.

(10) Patent No.: US 11,410,679 B2
(45) Date of Patent: Aug. 9, 2022

(54) ELECTRONIC DEVICE FOR OUTPUTTING SOUND AND OPERATING METHOD THEREOF

(71) Applicant: Samsung Electronics Co., Ltd., Suwon-si (KR)

(72) Inventors: Yeseul Hwang, Suwon-si (KR); Younghwan Ryu, Suwon-si (KR); Sangmin Park, Suwon-si (KR); Kyungtae Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 60 days.

(21) Appl. No.: 16/703,738

(22) Filed: Dec. 4, 2019

(65) Prior Publication Data
US 2020/0176017 A1 Jun. 4, 2020

(30) Foreign Application Priority Data
Dec. 4, 2018 (KR) .......................... 10-2018-0154175

(51) Int. Cl.
*G10L 15/08* (2006.01)
*G10L 25/54* (2013.01)
*G06F 40/205* (2020.01)

(52) U.S. Cl.
CPC ............ *G10L 25/54* (2013.01); *G06F 40/205* (2020.01); *G10L 15/08* (2013.01)

(58) Field of Classification Search
CPC .................................. G06F 14/00; G10L 25/87
See application file for complete search history.

(56) References Cited

U.S. PATENT DOCUMENTS

| 5,225,618 A * | 7/1993 | Wadhams .............. G09B 15/00 84/462 |
| 5,642,470 A | 6/1997 | Yamamoto et al. |
| 10,068,588 B2 | 9/2018 | Khan et al. |
| 2004/0107821 A1* | 6/2004 | Alcalde ................. G06F 16/683 84/608 |
| 2005/0103187 A1 | 5/2005 | Bodlaender |

(Continued)

FOREIGN PATENT DOCUMENTS

JP 2005-049773 A 2/2005
JP 4650182 B2 3/2011
(Continued)

OTHER PUBLICATIONS

ISA/KR, International Search Report and Written Opinion of the International Searching Authority, International Application No. PCT/KR2019/017013, dated Mar. 20, 2020, 8 pages.
(Continued)

*Primary Examiner* — Shreyans A Patel

(57) ABSTRACT

An electronic device includes a microphone, a speaker, a processor operatively connected to the microphone and the speaker, and a memory electrically connected to the processor and storing instructions that, when executed by the processor, cause the processor to receive a sound through the microphone, analyze the received sound, determine a song associated with the sound, and a kind of output sound based on at least in part on a result of the analyzing, generate an output sound based on the kind of output sound, and output the generated output sound through the speaker.

18 Claims, 15 Drawing Sheets

(56) References Cited

U.S. PATENT DOCUMENTS

| | | | | |
|---|---|---|---|---|
| 2005/0227674 | A1* | 10/2005 | Kopra | H04L 65/4084 |
| | | | | 455/414.1 |
| 2008/0065382 | A1* | 3/2008 | Gerl | G10L 25/87 |
| | | | | 704/258 |
| 2009/0019996 | A1* | 1/2009 | Fujishima | G10H 1/0025 |
| | | | | 84/625 |
| 2011/0087965 | A1* | 4/2011 | Johansson | G06F 16/637 |
| | | | | 715/727 |
| 2011/0273455 | A1* | 11/2011 | Powar | G10H 1/368 |
| | | | | 345/473 |
| 2012/0078824 | A1* | 3/2012 | Bonet | G06N 3/126 |
| | | | | 706/12 |
| 2012/0259637 | A1 | 10/2012 | Srinivas et al. | |
| 2013/0070093 | A1 | 3/2013 | Rivera et al. | |
| 2013/0226957 | A1 | 8/2013 | Ellis et al. | |
| 2014/0079297 | A1* | 3/2014 | Tadayon | G06K 9/00288 |
| | | | | 382/118 |
| 2015/0326688 | A1* | 11/2015 | Aarnio | G06F 16/683 |
| | | | | 707/748 |
| 2016/0379611 | A1 | 12/2016 | Georges et al. | |
| 2019/0042647 | A1* | 2/2019 | Oh | G06F 16/636 |
| 2019/0208270 | A1* | 7/2019 | Bates | H04N 21/43615 |

FOREIGN PATENT DOCUMENTS

| | | |
|---|---|---|
| JP | 5187563 B2 | 4/2013 |
| KR | 10-1014884 B1 | 2/2011 |
| WO | 2016109069 A1 | 7/2016 |
| WO | 2017058844 A1 | 4/2017 |

OTHER PUBLICATIONS

Birds, Digi, "Magic Blooms Signing and Dancing Flower, Glee," amazon.com, 2016, 5 pages.

Blaauw, Merlijn, et al., "A Neural Parametric Singing Synthesizer Modeling Timbre and Expression from Natural Songs," Applied Sciences, 7, 1313, 2017, 23 pages.

Jayakumar, Suraj, "ToneNet: A Musical Style Transfer," Towards Data Science, Nov. 28, 2017, 15 pages.

Kim, Jong Wook, et al., "Crepe: A Convolutional Representation for Pitch Estimation," arXiv:1802.06182v1 [eess.AS], Feb. 17, 2018, 5 pages.

Li, Jinna, et al., "Off-Policy Reinforcement Learning for Synchronization in Multiagent Graphical Games," IEEE Transactions on Neural Networks and Learning Systems, vol. 28, No. 10, Oct. 2017, 12 pages.

Malik, Iman, "Neural Translation of Musical Style," Blog (imanmalik.com), Jun. 5, 2017, 26 pages.

Nugraha, Aditya Arie, et al., "Multichannel Music Separation with Deep Neural Networks," 2016 24th European Signal Processing Conference, (EUSIPCO), IEEE, 2016, 5 pages.

SoundHound Inc., "Identifying and Playing Songs," soundhound.com, 2019, 2 pages.

Supplementary European Search Report dated Jul. 13, 2021 in connection with European Application No. 19892663.6, 7 pages.

Korean Intellectual Property Office, "Notice of Preliminary Rejection" dated Jun. 16, 2022, in connection with Korean Patent Application No. 10-2018-0154175, 11 pages.

\* cited by examiner

| SONGS | OUTPUT VERSION | PLAY INFORMATION |
|---|---|---|
| SONG 1 (410) | HUMMING VERSION (421) | SCORE, GAN, ... (431) |
| | LYRICS-INCLUSIVE VERSION (422) | SCORE, VOICE INFORMATION |
| | INSTRUMENTAL VERSION (423) | SCORE, GAN |
| SONG 2 (415) | HUMMING VERSION | STREAM, GAN |
| SONG 3 | HUMMING VERSION | SCORE, STREAM, GAN |
| | RAP VERSION | STREAM |
| ⋮ | | |

FIG.4

ELECTRONIC DEVICE FOR OUTPUTTING SOUND AND OPERATING METHOD THEREOF

CROSS-REFERENCE TO RELATED APPLICATIONS

This application is based on and claims priority under 35 U.S.C. § 119 to Korean Patent Application No. 10-2018-0154175, filed on Dec. 4, 2018, in the Korean Intellectual Property Office, the disclosure of which is herein incorporated by reference in its entirety.

BACKGROUND

1. Field

Various embodiments of the disclosure relate to an electronic device which outputs a sound in response to a user's voice input, and an operating method thereof, and more particularly, to an electronic device which provides a supporting sound (for example, a background sound) in response to a sound input of a user who is singing a song or playing an instrument, and an operating method thereof.

2. Description of Related Art

High-performance portable electronic devices such as smartphones or tablet personal computers (PCs) have become popular. Not only simple functions such as telephony, a messaging application, but also complex functions such as games, financial services are processed in portable electronic devices. In particular, as portable electronic devices can smoothly process high-capacity data, they can process users' voice signals including voice commands or can tell users what the title of a song coming from a street is.

The above information is presented as background information only to assist with an understanding of the disclosure. No determination has been made, and no assertion is made, as to whether any of the above might be applicable as prior art with regard to the disclosure.

SUMMARY

In receiving a song coming from a street or user's humming, and providing relevant information, related-art electronic devices do not consider various users or various situations. For example, an electronic device may provide the same information (for example, a title of a song) when there is humming regardless of whether an adult is humming or a child is humming, and does not provide different information according to different users. That is, related-art electronic devices fail to consider the diversity of input sounds or the diversity of contexts related to a sound input, and only provide uniform and unidirectional information, and thus may not satisfy demands of individuals having various music tastes.

Various embodiments of the disclosure can support user's various music experiences by determining and outputting an appropriate kind of output sound for an inputted sound according to a result of analyzing the inputted sound.

Various embodiments of the disclosure can correct and support an inputted sound by determining and outputting an appropriate kind of output sound for the input sound, and simultaneously, providing feedback regarding a difference from an original sound.

An electronic device according to various embodiments of the disclosure includes a microphone, at least one speaker, at least one processor operatively connected to the microphone and the speaker, and at least one memory electrically connected to the processor, and, when being executed, the memory stores instructions that cause the processor to receive a sound through the microphone, to analyze the received sound, to determine a song associated with the sound, and a kind of output sound, based on at least in part on a result of the analyzing, to generate an output sound based on at least in part on the kind of output sound, and to output the generated output sound through the speaker.

An operating method of an electronic device according to various embodiments of the disclosure includes: receiving a sound; analyzing the received sound; determining a song associated with the sound, and a kind of output sound, based on at least in part on a result of the analyzing; generating an output sound based on at least in part on the kind of output sound; and outputting the generated output sound.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 is a view illustrating a play mode database stored in a memory according to various embodiments of the disclosure;

DETAILED DESCRIPTION

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
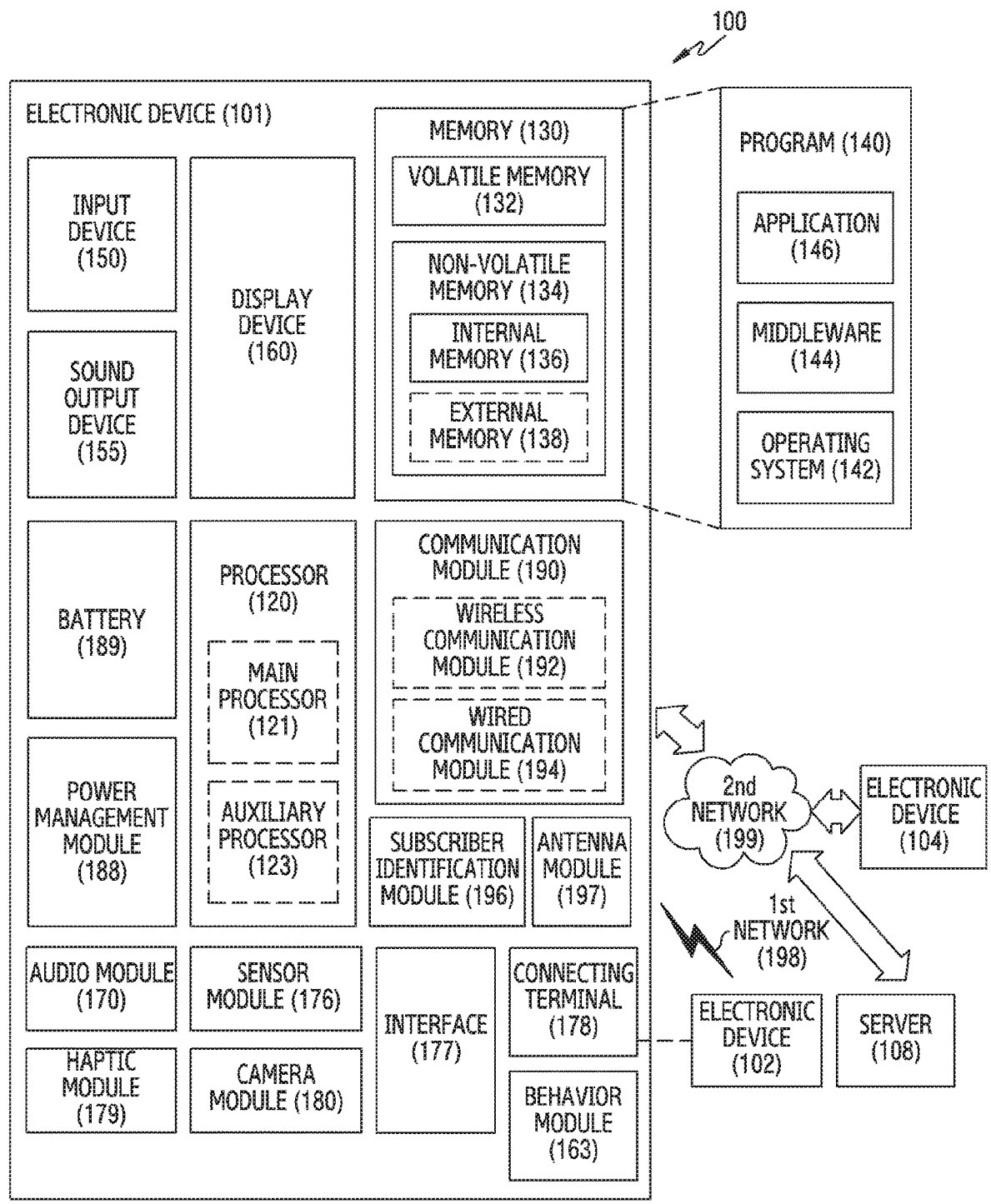
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas.

The behavior module 163 may perform an expression of a change in a facial expression, a posture expression, or traveling. According to an embodiment, the behavior module 163 may include a facial expression motor, a posture expression motor, or a driver. The facial expression motor may visually provide a state of the electronic device 101 through the display device 160. For example, the driver may be used to mechanically change a movement of the electronic device 101 and other elements. The driver may be rotatable in the vertical and horizontal directions or in the clockwise/counter clockwise direction with reference to at least one axis. The driver may be implemented by combining driving motors (for example, a wheel-type wheel, a sphere-type wheel, a continuous track, or a propeller), or may be implemented by being independently controlled.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1 st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added. The signal or the power may then be transmitted or received between the communication module 190 and the external electronic device via the selected at least one antenna.

Figure 2:
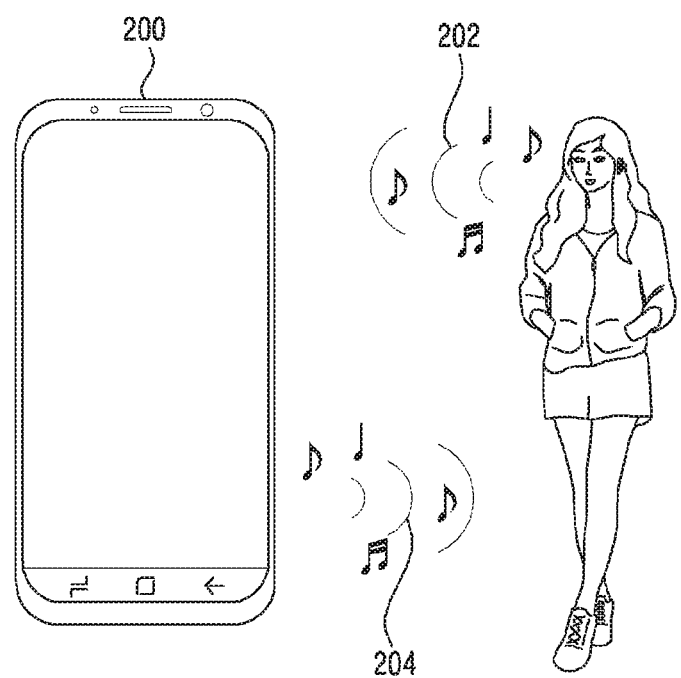
FIG. 2 is a schematic view illustrating various embodiments of the disclosure.

FIG. 2 is a schematic view illustrating various embodiments of the disclosure.

In an embodiment, an electronic device 200 may be the electronic device 101 shown in FIG. 1.

In an embodiment, the electronic device 200 may receive an input of a sound 202 (hereinafter, an "input sound") from a user. The electronic device 200 may include a microphone (for example, an input device 150), and may receive an input of a sound from the user through the microphone.

In an embodiment, the electronic device 200 may receive various types (kinds) of input sounds or various distinct input sounds. For example, the electronic device 200 may receive various types of input sounds, such as a voice command instructing an operation to be performed by the electronic device 200, a song having relationship information (for example, a beat, a chord, a rhythm) between text information (for example, lyrics) having a specific meaning and regular notes, humming having relationship information between meaningless text information and regular notes, an instrumental having relationship information between regular notes without text information or the like.

In an embodiment, the electronic device 200 may generate a sound 204 to be outputted (hereinafter, an "output sound") by using at least part of the received input sound, and may output the generated output sound. For example, the electronic device 200 may include a speaker (for example, the sound output device 155), and may output the output sound through the speaker.

In an embodiment, the electronic device 200 may generate various types (kinds) of output sounds or various distinct output sounds. For example, the electronic device 200 may generate various types of output sounds, such as a type including lyrics and an accompaniment, a type including only an accompaniment, a beat box, a type including only a part of a plurality of vocals when an original song is a duet song, or the like.

In an embodiment, a type of output sound may be determined according to a type of input sound. In an embodiment, a kind of output sound may be determined to support an input sound. For example, when the input sound is humming of a specific song (for example, "Let it be" of the Beatles), the electronic device 200 may generate an output sound including lyrics and an accompaniment of "Let it be." In another example, when the input sound corresponds to a male part of a male-female duet song, the electronic device 200 may generate an output sound corresponding to a female part of the duet song.

In an embodiment, the electronic device 200 may detect a user's motion which generates an input sound. The electronic device 200 may detect the user's motion at the same time as (or at substantially the same time as) receiving the input sound. For example, the electronic device 200 may include a camera module (for example, the camera module 180), and may detect a user's motion (for example, a lips motion) related to generation of an input sound, or a user's motion (for example, a user's hand motion or body motion) having nothing to do with generation of an input sound, by using the camera module. The user's motion may be additionally used to determine a kind of output sound or to determine context information related to the input sound.

In an embodiment, the electronic device 200 may obtain information regarding the user generating the input sound. The electronic device 200 may obtain identification information of the user generating the input sound (for example, information indicating that a person who generates the current input sound is the daughter of the user corresponding to the electronic device 200), or characteristic information of the user (for example, the person who generates the current input sound is a girl aged from 5 to 7), based on image information captured by the camera module. The information regarding the user who generates the input sound may be additionally used to determine a kind of output sound.

In an embodiment, the electronic device 200 may obtain context information related to the input sound. For example, the electronic device 200 may obtain surrounding environment information when the input sound is inputted. In another example, the electronic device 200 may obtain information regarding the number of times of singing a specific song by using use history information of the user. The context information related to the input sound may be additionally used to determine a kind of output sound.

Figure 3:
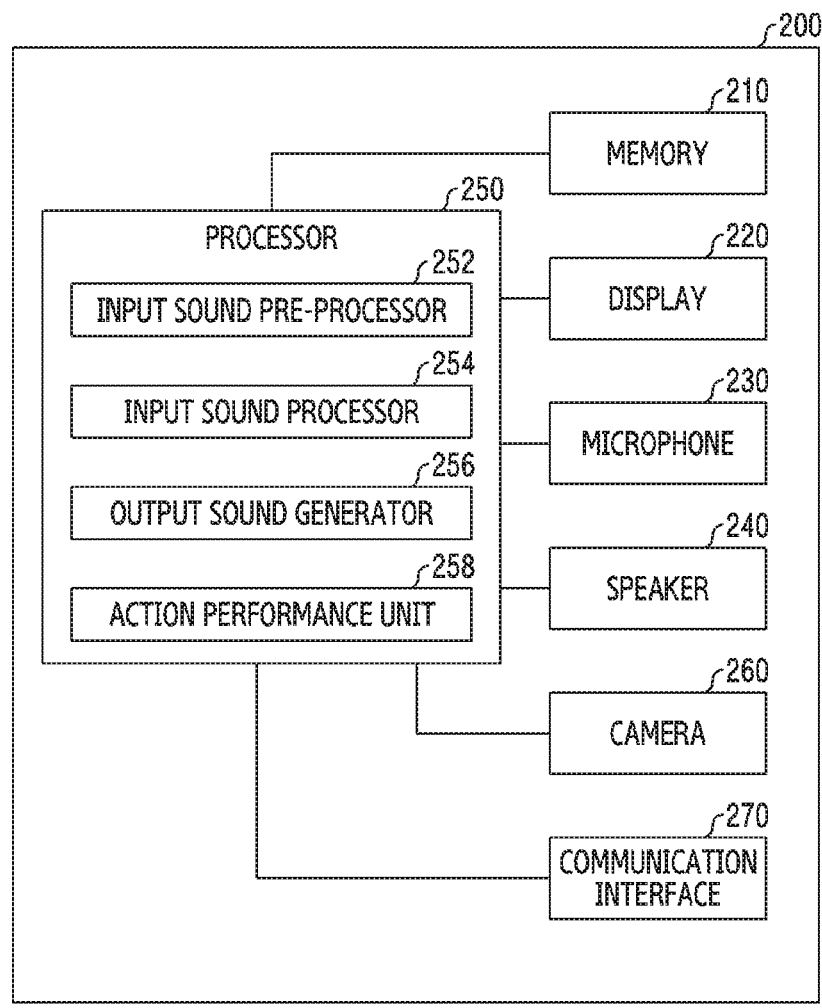
FIG. 3 is a block diagram illustrating an electronic device according to various embodiments of the disclosure.

FIG. 3 is a block diagram illustrating an electronic device according to various embodiments of the disclosure.

In an embodiment, the electronic device 200 may include a memory 210, a display 220, a microphone 230, a speaker 240, a processor 250, a camera module 260, and a communication interface 270.

In an embodiment, the memory 210 may be the memory 130 disclosed in FIG. 1.

In an embodiment, the memory 210 may store an instruction that causes the electronic device 200 to perform at least one operation according to various embodiments of the disclosure under control of the processor 250. For example, the memory 210 may store an instruction that causes the processor 250 to analyze an input sound received through the microphone 230.

In an embodiment, the memory 210 may store reference data (or auxiliary data) for the electronic device 200 to perform a designated operation.

For example, the memory 210 may store various types (kinds) of output sounds, or information for generating various types of output sounds.

In an embodiment, the memory 210 may store a plurality of pieces of music or songs in stream forms or waveform forms corresponding to original songs.

In an embodiment, the memory 210 may store various types (kinds) of output sounds by correlating (or mapping) the output sounds with a specific song, and may store the various types (kinds) of output sounds independently from (or regardless of) specific song information. In another embodiment, the memory 210 may store parameter information for generating various types (kinds) of output sounds (or output waveform forms) by correlating the parameter information with a specific song or may independently store the parameter information, and may separately store a generation model (for example, a generative adversarial network (GAN)) for generating various types (or kinds) of output sounds based on the parameter information.

In another example, the memory 210 may store a play mode database in which information regarding one or more play modes corresponding to a specific song is stored.

In still another example, the memory 210 may store personal information (for example, sex, age, an image regarding appearance, tendency (preference), information of a musical instrument that the user can play) regarding one or more users. The preference information of the user may include user's preference information regarding songs, singers, genres (of song or dance), a play mode (or an output version) corresponding to a specific song, generation and provision of an output sound according to an embodiment of the disclosure. For example, when the user has a history of having manually terminated output of an output sound or having exited from an application performing a corresponding function while the output sound is being outputted, user's preference information regarding this may be stored in the memory 210.

In yet another example, the memory 210 may store use history information or history data regarding one or more users (for example, a song that the user sang previously, the number of times the user has sung a specific song).

In an embodiment, the information regarding one or more users stored in the memory 210 may be manually inputted by the user, or may be automatically generated and inputted based on history data of the user.

In an embodiment, the display 220 may be the display device 160 disclosed in FIG. 1. The display 220 may display at least one content (for example, a user interface for manually receiving user's determination of a kind of output sound). The display 220 may receive a user's touch input. For example, the display 220 may receive a user's touch input of selecting at least one object included in the displayed user interface.

In an embodiment, the microphone 230 may receive an input sound. The microphone 230 may correspond to the input device 150 of FIG. 1.

In an embodiment, the speaker 240 may output an output sound. The speaker 240 may be one or more speakers and may correspond to the sound output device 155 of FIG. 1.

In an embodiment, the camera module 260 may capture an image (for example, a still image or a moving image). The camera module 260 may correspond to the camera module 180 of FIG. 1. For example, the camera module 260 may capture and store an image regarding a user's motion which generates an input sound while receiving the input sound.

In an embodiment, the communication interface 270 may be used to communicate data with an external device (not shown). The communication interface 270 may correspond to the communication module 190 of FIG. 1. For example, the communication interface 270 may transmit input sound data to an external device to determine (or search) a song associated with the input sound.

In an embodiment, the processor 250 may control overall operations of the electronic device 200. The processor 250 may analyze an input sound received through the microphone 230, and may identify (or determine) a song corresponding to the input sound based on at least in part on a result of analyzing, or may determine a kind of output sound. The processor 250 may generate an output sound based on the identified song or the determined kind of output sound. The processor 250 may control the speaker 240 to output the generated output sound.

In an embodiment, the processor 250 may include an input sound pre-processor 252, an input sound processor 254, an output sound generator 256, and an action performance unit 258.

In an embodiment, the input sound pre-processor 252 may perform a pre-processing operation to enhance accuracy and reliability of analysis prior to analyzing an input sound received through the microphone 230. In an embodiment, the input sound pre-processor 252 may include an echo canceller to remove an echo and/or a noise suppressor to remove a noise. Hereinafter, a sound pre-processed by the input sound pre-processor 252 may be referred to as an input sound.

In an embodiment, the input sound processor 254 may analyze the input sound. For example, the input sound processor 254 may include a music determination unit (not shown) to determine whether the input sound corresponds to music. In another example, the input sound processor 254 may include a music genre determination unit (not shown) to determine a genre of the input sound when it is determined that the input sound corresponds to music. The music genre determination unit (not shown) may determine not only the genre of the input sound but also musical feature information (for example, a beat, a tune, sex of the user generating the input sound) of the input sound.

In another example, the input sound processor 254 may include a user information determination unit (not shown) to identify the user generating the input sound, by using at least one of image information received from the camera module 260 and user information searched from the memory 210. In still another example, the input sound processor 254 may include a song determination unit (not shown) to determine a song associated with the input sound. In yet another example, the input sound processor 254 may include a context information obtaining unit (not shown) to obtain context information associated with the input sound.

In an embodiment, the input sound processor 254 may include an output sound kind determination unit (not shown) to determine a kind of output sound based on at least in part on the result of analyzing the input sound. The output sound kind determination unit (not shown) may determine a kind of output sound by additionally using at least one of the song information determined by the song determination unit (not shown), personal information regarding the user identified by the user information determination unit (not shown), the image information received from the camera module 260, and the context information obtained by the context information obtaining unit. The kind of output sound may correspond to various output versions (or play modes) of a specific song. For example, the kind of output sound may be any one of a humming version of a specific song, a version including lyrics, an instrumental version, or a sound effect version.

In an embodiment, the output sound generator 256 may generate an output sound based on at least in part on the determined kind of output sound. For example, the output sound generator 256 may generate the output sound by changing an original song stream stored in the memory 210 to correspond to the determined kind of output sound. In another example, the output sound generator 256 may generate the output sound by inputting one or more parameters corresponding to the determined kind of output sound into a separate generation model.

In an embodiment, the action performance unit 258 may perform at least one action associated with the generated output sound. For example, the action performance unit 258 may control the speaker 240 to output the generated output sound. In another example, the action performance unit 258 may determine information regarding a specific motion, a moving line to cause the electronic device 200 to move according to the output sound. In an embodiment, the action performance unit 258 may correspond to the behavior module 163 disclosed in FIG. 1.

FIG. 4 is a view illustrating a play mode database stored in a memory according to various embodiments of the disclosure.

In an embodiment, the play mode database 400 may be stored in the memory 210.

In an embodiment, the play mode database 400 may store one or more play modes 421 to 423 corresponding to a specific song 410, and play information 431 corresponding to a specific play mode 421. In an embodiment, the play mode may have substantially the same meaning as an output version or a kind of output sound.

In an embodiment, the play mode may define a form (or a music style) of an output sound outputted by the electronic device 200, and may correspond to feature information of the defined form or feature information (or feature information of a music style, for example, a beat or a whole tempo, a tune, a tone, a pitch, a rhythm, a spectrum, or the like) for realizing the defined music style.

In an embodiment, the play mode may be mapped onto feature information, and may be stored.

In an embodiment, the play mode may include a song mode including vocals, a humming mode including humming without vocals, an instrumental mode including a sound using a musical instrument, a rap mode including rap or beat box (or a beat box mode), an sound effect mode providing a narration suitable for a genre or lyrics of an input sound, or a sound effect, a duet mode supporting a lack part in a duet song (for example, a female vocal part, a rap part), a metronome mode supporting a beat of an input sound, a coaching mode providing feedback as to an incorrect note or inaccurate lyrics of an input sound.

In an embodiment, one specific song may correspond to one or more play modes. The number of corresponding play modes may be determined according to characteristics of the song (for example, genre characteristic, presence/absence of vocals). For example, song 1 410 may correspond to three play modes (a humming version 421, a lyrics-inclusive version 422, an instrumental version 423). In another example, when song 2 415 is light music, song 2 415 may not correspond to a lyrics-inclusive version.

In an embodiment, the play information 431 for implementing the specific play mode 421 may be mapped onto the specific play mode 421 and may be stored. For example, the play information 431 may store score information (or waveform data) used for implementing song 1 410 in the humming version 421. In another example, the play information 431 may store parameter information regarding one or more parameters that should be inputted to the GAN to implement song 1 410 in the humming version 421.

Figure 5:
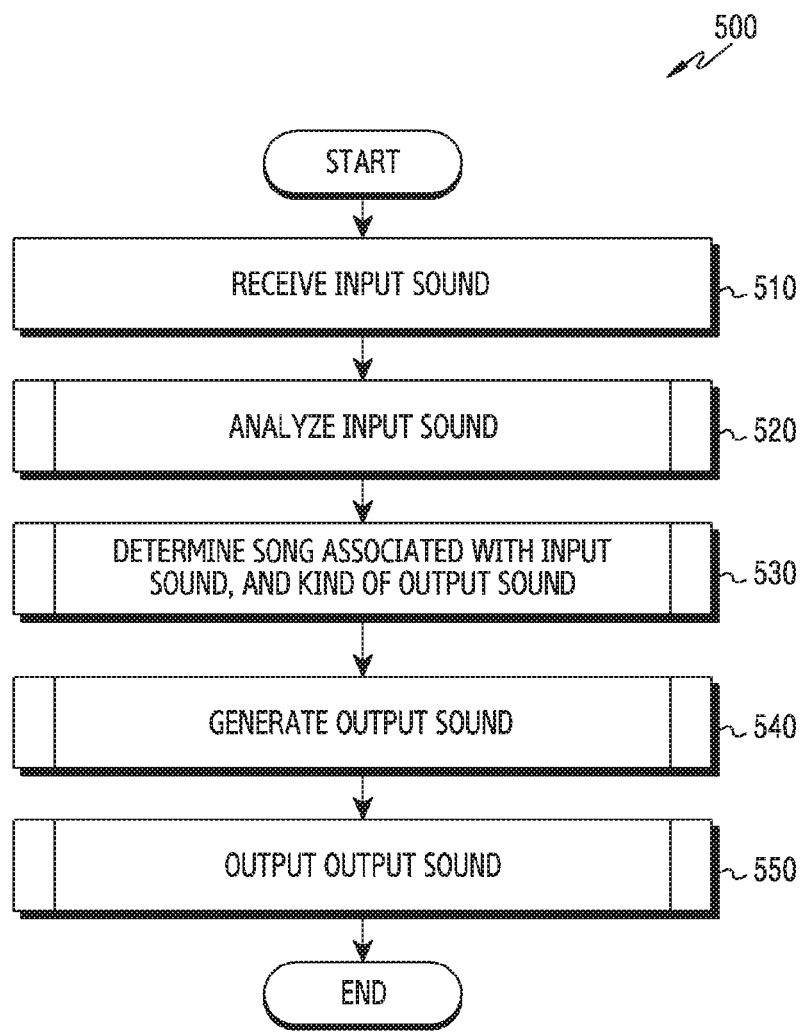
FIG. 5 is a flowchart illustrating a flow of operations performed by an electronic device according to various embodiments of the disclosure.

FIG. 5 is a flowchart illustrating a flow 500 of operations performed by an electronic device according to various embodiments of the disclosure.

In an embodiment, the operations disclosed in FIG. 5 may be performed by an electronic device (for example, the electronic device 200 of FIG. 2 or the processor of the electronic device (for example, the processor 250 of FIG. 3)). Hereinafter, it is illustrated that the electronic device 200 performs the operations disclosed in FIG. 5.

In an embodiment, in operation 510, the electronic device 200 may receive an input sound. For example, the electronic device 200 may receive a humming sound of a user regarding "Let it be" of the Beatles through a microphone (for example, the microphone 230 of FIG. 3). In another example, the electronic device may receive a voice of a user who sings "Let it be" of the Beatles in a rap version (in other words, with a faster beat than the beat of the original song by a constant ratio).

In an embodiment, in operation 520, the electronic device 200 may analyze the input sound.

For example, the electronic device 200 may extract text information by analyzing the input sound.

In another example, the electronic device 200 may obtain information regarding at least one of musical features such as an intensity, a tone, a pitch, a rhythm, a spectrum, a tune, a beat of the input sound, by analyzing the input sound. Alternatively, the electronic device 200 may analyze the input sound based on at least one of the intensity, tone, pitch, rhythm, spectrum, tune, beat of the input sound.

For example, the electronic device 200 may detect the pitch by utilizing a method using CNN (convolutional neural network) based on time-domain waveform data.

The electronic device 200 may determine whether to perform operation 520 based on user information stored in the memory 210 although this is not illustrated. For example, for a user who has refused the output sound outputting function according to an embodiment of the disclosure, the electronic device 200 may not perform operation 520. Accordingly, the electronic device 200 may search preference information (or a preference value) of the user, who generates the input sound, regarding the output sound outputting function according to an embodiment of the present disclosure, to determine whether to perform operation 520 prior to performing operation 520.

In an embodiment, in operation 530, the electronic device 200 may determine a song associated with the input sound, and a kind of output sound.

In an embodiment, in determining the song associated with the input sound, the electronic device 200 may transmit the input sound (or information obtained by processing the input sound) to an external server through a communication interface (for example, the communication interface 270). The electronic device 200 may determine the song associated with the input sound by inputting at least part of the result of analyzing, obtained in operation 520, into a music search program stored in a memory (for example, the memory 210 of FIG. 3).

In an embodiment, in determining the kind of output sound, the electronic device 200 may determine the kind of output sound based on at least one play mode from among a plurality of play modes (or output versions) corresponding to the determined song. For example, when a song A is associated with the input sound and the song A corresponds to three play modes, the instrumental mode, the rap mode, and the lyrics-inclusive mode, the electronic device 200 may determine the kind of output sound based on at least one play mode of the three play modes. Information regarding one or more play modes corresponding to a specific song may be pre-stored in the memory 210.

In an embodiment, the electronic device 200 may use at least part of the result of analyzing obtained in operation 520 in determining the kind of output sound. For example, the electronic device 200 may determine any one play modes of the three play modes supported by the song A by using at least part of the result of analyzing obtained in operation 520. For example, when the beat of the input sound is faster than the original beat of the song A by a constant ratio, the electronic device 200 may determine the rap mode from among the three play modes.

In an embodiment, in determining the kind of output sound, the electronic device 200 may additionally use at least part of context information related to the input sound.

In an embodiment, in operation 540, the electronic device 200 may generate an output sound.

In an embodiment, the electronic device 200 may generate the output sound based on the kind of output sound determined in operation 530.

For example, the electronic device 200 may generate the output sound by inputting at least one parameter corresponding to the kind of output sound determined in operation 530 into a generation model (GAN) which can generate various types of output sounds.

In another example, the electronic device 200 may generate the output sound by arranging the song (for example, the song A) associated with the input sound to correspond to any one play mode of the play modes supported by the song.

In another example, the electronic device 200 may generate the output sound by synthesizing a stream of the song associated with the input sound (for example, the song A) with a stream or a waveform corresponding to the kind of output sound (or play mode) determined in operation 530.

In an embodiment, in operation 550, the electronic device 200 may output the output sound. For example, the electronic device 200 may output the output sound through a speaker (for example, the speaker 240).

The electronic device 200 may update user information after outputting the output sound although this is not illustrated. For example, the electronic device 200 may map the searched song, musical features, dance pattern information, or the like onto the user, and store the mapped information, or may update the preference information stored in the memory 210 based on the information.

Figure 6:
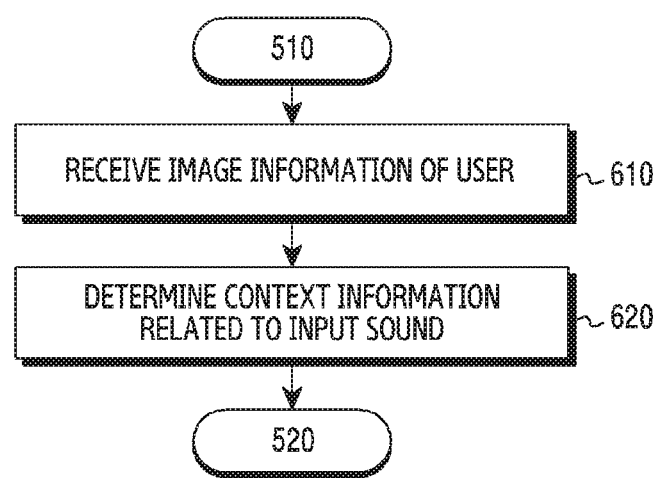
FIG. 6 is a flowchart illustrating a flow of operations performed by an electronic device after receiving an input sound according to various embodiments of the disclosure.

FIG. 6 is a flowchart illustrating a flow of operations performed by an electronic device after receiving an input sound according to various embodiments of the disclosure.

The operations disclosed in FIG. 6 may be performed before operation 520 is performed and after operation 510 of FIG. 5 is performed.

In an embodiment, in operation 610, the electronic device 200 may receive image information of the user. For example, the electronic device 200 may receive the image information of the user from the camera module 260. The electronic device 200 may receive the image information of the user captured while the input sound is being received.

In an embodiment, in operation 620, the electronic device 200 may determine context information related to the input sound.

For example, the electronic device 200 may determine context information related to the user generating the input sound. The electronic device 200 may determine, as context information related to the user, information of the user while the user is generating the input sound, such as emotion information, a pronunciation state, a facial expression, concentration, by using the image information of the user received in operation 610, prosody information related to the input sound. The electronic device 200 may search user's preference information (or tendency information) stored in the memory 210.

In another example, the electronic device 200 may obtain surrounding (or external) context information (for example, time information, place information, weather information) when the input sound is inputted.

In still another example, the electronic device 200 may obtain internal context information (for example, user's use history information, information of the number of times) related to the input sound.

In an embodiment, the electronic device 200 may proceed to operation 520. For example, the electronic device 200 may analyze the input sound in operation 520. The electronic device 200 may analyze the input sound in operation 520 by additionally using at least one of the image information of the user obtained in operation 610, and the context information obtained in operation 620.

Figure 7:
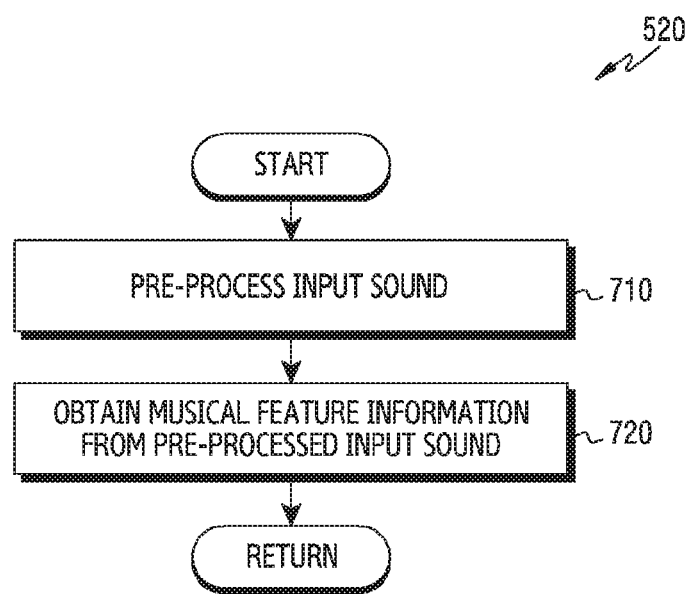
FIG. 7 is a flowchart illustrating a flow of operations performed by an electronic device to analyze an input sound according to various embodiments of the disclosure.

FIG. 7 is a flowchart illustrating a flow of operations performed by an electronic device to analyze an input sound according to various embodiments of the disclosure.

In an embodiment, the operations disclosed in FIG. 7 may be detailed operations of operation 520 of FIG. 5.

In an embodiment, in operation 710, the electronic device 200 may pre-process the input sound. For example, the electronic device 200 may pre-process the input sound by removing an echo and/or a noise from the input sound.

In an embodiment, in operation 720, the electronic device 200 may obtain musical feature information from the pre-processed input sound. For example, the electronic device 200 may obtain musical feature information such as a beat, a tune, and information regarding sex of the user generating the input sound (for example, a male part of a duet song).

In an embodiment, the electronic device 200 may obtain information unrelated to vocalization from the input sound. For example, the electronic device 200 may obtain information regarding a musical instrument included in the input sound, and information regarding a genre related to the input sound.

In an embodiment, the electronic device 200 may determine a vocalization style or a singing style of the user, based on at least one of the pre-processed input sound or the musical feature information obtained from the pre-processed input sound. For example, the electronic device 200 may determine that the user is singing a song in a hip-hop style based on the obtained beat information. In another example, the electronic device 200 may determine that the user is singing a song in a jazz style based on the obtain beat information and tune information. The user's vocalization style or singing style may be additionally utilized in determining the kind of output sound (or play mode) afterward.

Figure 8:
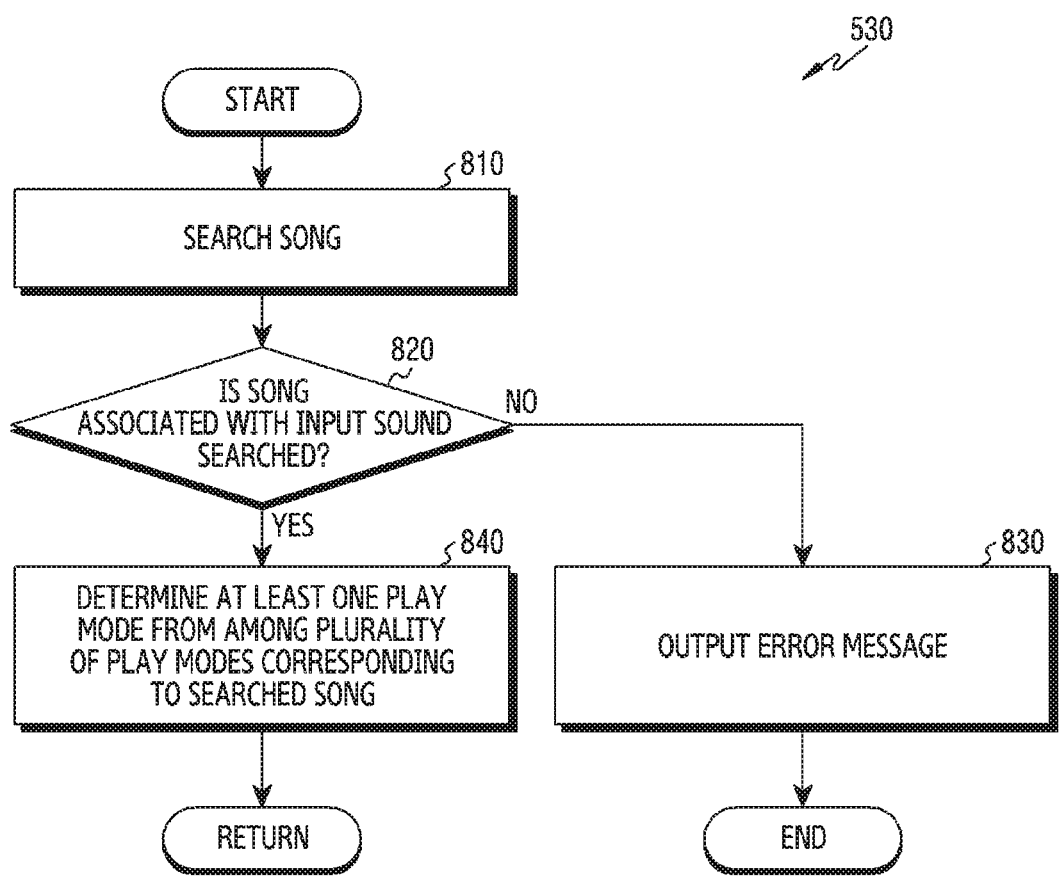
FIG. 8 is a flowchart illustrating a flow of operations performed by an electronic device to determine a song associated with an input sound and a kind of sound to be outputted according to various embodiments of the disclosure.

FIG. 8 is a flowchart illustrating a flow of operations performed by an electronic device to determine a song associated with an input sound and at least one play mode from among a plurality of play modes corresponding to the song according to various embodiments of the disclosure.

In an embodiment, the operation of determining a play mode may be substantially the same as the operation of determining a kind of sound to be outputted.

In an embodiment, the operations disclosed in FIG. 8 may be detailed operations of operation 530 of FIG. 5.

In an embodiment, in operation 810, the electronic device 200 may search a song. For example, the electronic device 200 may search a song associated with the input sound, by using at least part of the result of analyzing the input sound, obtained in operation 520. For example, the electronic device 200 may search a song associated with the input sound, by using musical features such as an intensity, a tone, a pitch, a rhythm, or a feature vector generally used for audio signal processing (for example, mel-frequency cepstrum coefficients (MFCC), line spectral pairs (LSP)). In another example, the electronic device 200 may search a song associated with the input sound by additionally using user's personal information (for example, preference information).

In an embodiment, various classification algorithms (for example, a neural network, a support vector machine (SVM), a hidden Markov model (HMM)) may be used in searching a song.

In an embodiment, the electronic device 200 may transmit the input sound to an external server to search a song associated with the input sound. In another example, the electronic device 200 may input at least part of at least one of the input sound or the result of analyzing the input sound into a music search program stored in the memory 210 in order to search a song associated with the input sound.

In an embodiment, in operation 820, the electronic device 200 may determine whether the song associated with the input sound is searched.

When the song associated with the input sound is not searched (No in operation 820), the electronic device 200 may output an error message in operation 830. For example, since the song associated with the input sound is not searched, the electronic device 200 may output an error message indicating that background music cannot be generated.

When the song associated with the input sound is searched (Yes in operation 820), the electronic device 200 may determine at least one play mode (or output version (kind of output sound)) from among a plurality of play modes (or output versions (kinds of output sounds)) corresponding to the searched song.

In an embodiment, the electronic device 200 may determine at least one play mode of the plurality of play modes corresponding to the searched song, based on at least part of feature information of the plurality of play modes corresponding to the result of analyzing the input sound and the searched song, for implementing respective music styles of the play modes.

For example, the electronic device 200 may determine one play mode (for example, a rap mode) that has beat information corresponding to or matching beat information of the input sound (for example, that has beat information whose difference in beat for a designated time is less than or equal to a threshold value) from among the plurality of play modes (for example, an instrumental mode, a rap mode) corresponding to the searched song.

In an embodiment, the electronic device 200 may determine at least one play mode from among the plurality of play modes corresponding to the searched song, additionally based on at least part of the result of analyzing the input sound and information regarding the searched song (for example, whether the song is a duet song, genre information of the searched song, whole tempo information (for example, Andante, Adagio, etc.) of the searched song, accuracy, reliability of musical features). For example, when the searched song is a duet song, and the result of analyzing the input sound indicates that the input sound is generated only by a male, the electronic device 200 may determine at least one play mode (for example, a duet mode) from among the plurality of play modes (for example, the instrumental mode, the rap mode, the duet mode).

In an embodiment, the electronic device 200 may determine at least one play mode from among the plurality of play modes corresponding to the searched song, additionally based on at least part of the result of analyzing the input sound, the context information determined in operation 620, and the user's preference information.

In an embodiment, the electronic device 200 may determine at least one play mode from among the plurality of play modes corresponding to the searched song, based on at least one of the result of analyzing the input sound and/or the searched song information, independently from a user's input as described above, or may determine at least one play mode based on a user's input. For example, the user's input may be inputted before the input sound is received and relevant data may be stored in the memory 210. In another example, the user's input may be inputted after the input sound is received or while the input sound is being received. A detailed description thereof will be disclosed in the explanation of FIGS. 9A and 9B.

In an embodiment, in determining at least one play mode from among the plurality of play modes, various classification algorithms may be used.

Figures 9A, 9B:
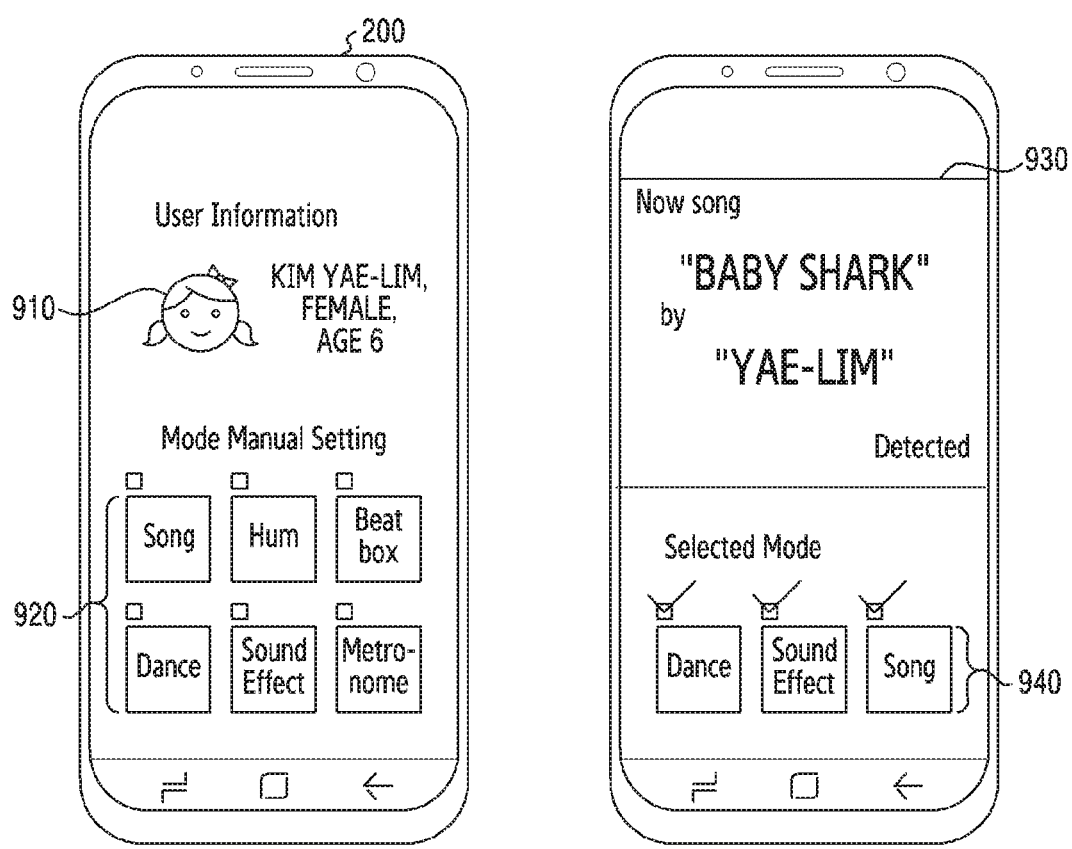
FIG. 9A is a view illustrating an example of a user interface provided to a user to receive selection of one play mode from among a plurality of play modes according to various embodiments of the disclosure.
FIG. 9B is a view illustrating an example of the user interface provided to the user to receive selection of one play mode from among the plurality of play modes according to various embodiments of the disclosure.

FIG. 9A is a view illustrating an example of a user interface provided to a user to receive selection of one play mode from among a plurality of play modes according to various embodiments of the disclosure, and FIG. 9B is a view illustrating an example of the user interface provided to the user to receive selection of one play mode from among the plurality of play modes according to various embodiments of the disclosure.

Referring to FIG. 9A, the electronic device (for example, the electronic device 200) may receive setting of a play mode in advance. For example, the electronic device 200 may receive information regarding one or more specific play modes according to user's preference from the user prior to receiving an input sound. Specifically, the electronic device 200 may display a plurality of objects 920 indicating a plurality of play modes on a display (for example, the display 220), and may receive a user input of selecting one or more objects from the plurality of objects. The electronic device 200 may give priorities to the corresponding one or more play modes according to an order of selection of the one or more objects. In another example, the electronic device 200 may identify a user who sets the play mode in receiving the setting of the play mode, and may provide information 910 of the identified user.

In receiving the setting of the play mode in advance, the electronic device 200 may receive the setting of the play mode in association with a specific song or a specific genre although this is not illustrated. For example, the electronic device 200 may receive selection of a beat box mode of a first priority and a lyrics-inclusive mode of a second priority in the case of a hip-hop genre, and may receive selection of an instrumental mode in the case of other genres.

In an embodiment, the electronic device 200 may store information regarding the play mode set in advance in the memory 210. The electronic device 200 may map the information regarding the selected one or more play modes onto the user's identification information, and may store the information. For example, when a user A selects two play modes (a humming mode and a lyrics-inclusive mode), the electronic device 200 may identify the user A by using image information received from the camera module 260, and may map identification information of the identified user A onto the information regarding the selected play modes and may store the information.

When an input sound is received from the same user afterward, the information regarding the play mode, which is stored in the memory 210, may be used for generating an output sound based on the received input sound. For example, when the user A sets the humming mode to the first priority in advance and a song associated with the input sound supports the humming mode, the electronic device 200 may generate an output sound based on the humming mode.

Referring to FIG. 9B, the electronic device 200 may receive setting of a play mode after an input sound is received or while receiving the input sound. For example, the electronic device 200 which receives an input sound singing a children's song like "Baby Shark" from the user A may display the title 930 of the song ("Baby Shark") associated with the input sound on the display 220, and simultaneously, may additionally display a plurality of objects 940 indicating a plurality of play modes corresponding to the song associated with the input sound. The electronic device 200 may display only the plurality of objects indicating the plurality of play modes supported by the song associated with the input sound, or may display the plurality of objects indicating all of the play modes, but may display some objects indicating the plurality of play modes supported by the song associated with the input sound as user-selectable objects and may disable the other objects not to be selected.

Figure 10:
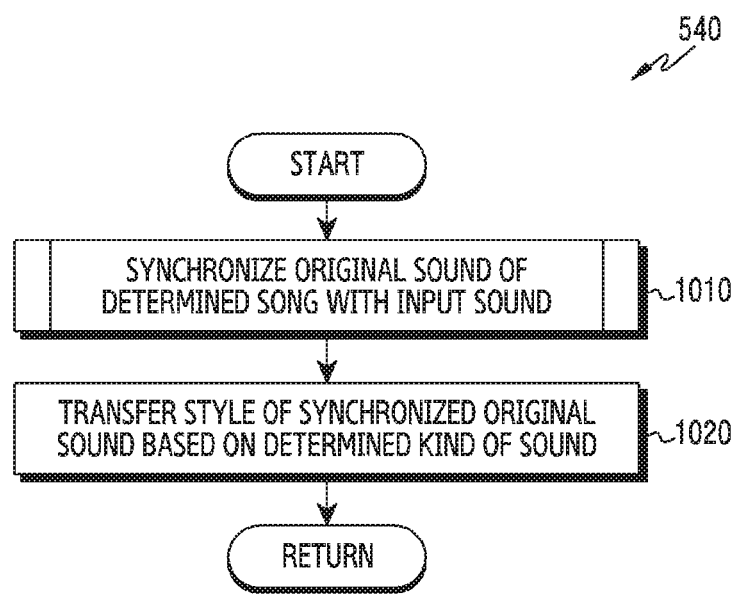
FIG. 10 is a flowchart illustrating a flow of operations performed by an electronic device to generate an output sound according to various embodiments of the disclosure.

FIG. 10 is a flowchart illustrating a flow of operations performed by an electronic device to generate an output sound according to various embodiments of the disclosure.

In an embodiment, the operations disclosed in FIG. 10 may be detailed operations of operation 540 of FIG. 5.

In an embodiment, in operation 1010, the electronic device 200 may synchronize an original sound of a determined song with an input sound.

In an embodiment, the electronic device 200 may search play information corresponding to the determined song from the memory 210. For example, the electronic device 200 may search information regarding a score, stream data, gain information corresponding to the song searched in operation 530 or 810 from a play mode database (for example, the play mode database 400).

In an embodiment, the electronic device 200 may determine a point of time or a section of the original sound that corresponds to the input sound, and may synchronize the original sound after the determined point of time or section with the input sound. Specifically, the electronic device 200 may synchronize at least one of a beat, a tone of the original sound with the input sound. For example, when the original sound is in three-four time and the input sound is in four-four time, the time of the original sound may be synchronized with four-four time from three-four time.

In an embodiment, in operation 1020, the electronic device 200 may transfer a style of the synchronized original sound based on a determined kind of output sound. The electronic device 200 may transfer the style of the original sound synchronized in operation 1010 based on the kind of output sound determined in operation 530.

In an embodiment, the electronic device 200 may use a generation model (or a style transfer model) in transferring the style of the synchronized original sound. For example, the generation model may be any one of the variational auto-encoder, the GAN. The electronic device 200 may transfer the style of the synchronized original sound by inputting at least one parameter associated with the synchronized original sound and the determined kind of output sound into the generation model.

In an embodiment, the electronic device 200 may use a sound synthesis method in transferring the style of the synchronized original sound. For example, the electronic device 200 may synthesize the synchronized original sound with a sound corresponding to the determined kind of output sound. The electronic device 200 may utilize a machine learning-based method in synthesizing a plurality of sounds. For example, since sound data is normally formed of continuous data, a method based on a recurrent neural network (RNN), long short-term memory models (LSTM) may be utilized.

In an embodiment, the electronic device 200 may additionally use context information in transferring the style of the synchronized original sound. For example, the electronic device 200 may transfer the style of the synchronized original sound by inputting at least one parameter associated with the context information. For example, the electronic device 200 may set sound information (whole tempo or tune) related to the context as a kind of constraint parameter in synthesizing the sound.

For example, the electronic device 200 may determine information related to a user's mood (for example, numeric information related to happiness or joy) based on at least one of tone information of the input sound, user's image information. When numeric information related to user's happiness or joy exceeds a threshold, the electronic device 200 may input sound information corresponding to a high tempo and a high tone into a model for synthesizing a sound (for example, LSTM) as a constraint parameter.

In another example, when numeric information related to user's sadness exceeds a threshold, the electronic device 200 may input sound information corresponding to a slow tempo and a low tone into the model for synthesizing the sound as a constraint parameter, in order to generate an output sound corresponding a ballad genre.

In still another example, when current time information is the evening, when it is raining, or when the user lives with a child and the current location of the electronic device 200 is the house of the user, the electronic device 200 may input sound information corresponding to a slow tempo and a low tone into the model for synthesizing the sound.

Figure 11:
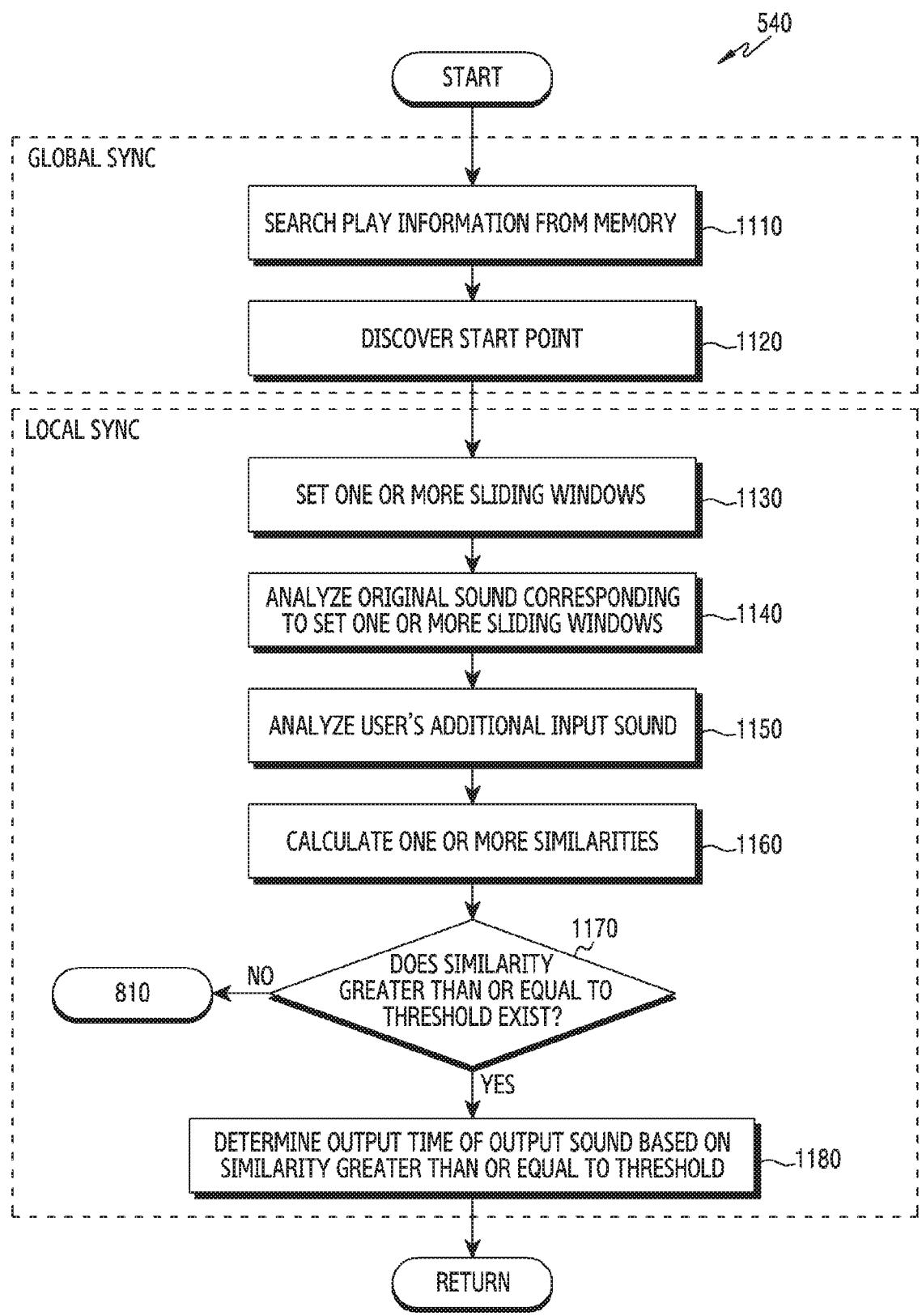
FIG. 11 is a flowchart illustrating a flow of operations performed by an electronic device to synchronize an original sound with an input sound according to various embodiments of the disclosure.

FIG. 11 is a flowchart illustrating a flow of operations performed by an electronic device to synchronize an original sound with an input sound according to various embodiments of the disclosure.

In an embodiment, the operations disclosed in FIG. 11 may be detailed operations of operation 1010 of FIG. 10.

In an embodiment, the operations disclosed in FIG. 11 may be classified into two kinds of operations. Operations 1110 and 1120 may correspond to a sync operation for discovering a start point within the original sound, and hereinafter, are referred to as global sync. Operations 1130 to 1180 may correspond a sync operation for synchronizing at least one of a beat, a tune of the original sound within at least some section with the input sound while playing the output sound, and hereinafter, are referred to as local sync.

In an embodiment, the global sync may selectively be performed. For example, when the song associated with the input sound is searched in operation 820 of FIG. 8, the global sync may be performed. In another example, when the song associated with the input sound is not searched, the global sync may not be performed.

In an embodiment, the global sync may be performed by using information regarding the searched song.

In an embodiment, in operation 1110, the electronic device 200 may search play information corresponding to the determined song from the memory 210. For example, the electronic device 200 may search information regarding a score, stream data corresponding to the song searched in operation 530 or 810 from the memory 210.

In an embodiment, in operation 1120, the electronic device 200 may discover a start point based on the play information and the input sound. The electronic device 200 may determine which point of time (or which time section) of the determined song the input sound corresponds to. For example, the electronic device 200 may determine which point of time (or which time section) of the determined song the input sound corresponds to, by repeatedly matching the input sound with at least some section of the score corresponding to the determined song. In another example, the electronic device 200 may generate the searched stream data, and may determine which point of time (or which time section) of the determined song the input sound corresponds to, by matching the input sound with each section of the generated stream data.

For example, when an input sound "humpty dumpty had a great fall" is received, the electronic device 200 may determine whether a portion of the input sound in the original song corresponds to the input sound, and may determine a portion starting with "All the king's horses" which is the next portion of the original song as a start point of an output sound.

In an embodiment, the electronic device 200 may set one or more sliding windows of a designated length in operation 1130. For example, the electronic device 200 may determine one or more sliding windows of the designated length within a range after the start point of the output sound. For example, when the start point of the output sound is determined to t=2(s), the electronic device 200 may determine one or more sliding windows that have a length of 1 second and have different starts points (for example, a first sliding window (for example, t=2~t=3), a second sliding window (for example, t=2.1~t=3.1), a third sliding window (for example, t=2.2~t=3.2).

In an embodiment, in operation 1140, the electronic device 200 may analyze original sounds corresponding to the set one or more sliding windows. For example, the electronic device 200 may identify musical feature information (for example, a pitch, a timbre, an intensity, a duration, a beat) of the original sound corresponding to the first sliding window (t=2~t=3).

In an embodiment, in operation 1150, the electronic device 200 may analyze an additional input sound of the user. The electronic device 200 may analyze a user's input sound of a designated range (for example, a length of a time section) that is inputted after the start point of the output sound. For example, the electronic device 200 may analyze a user's input sound of the length of 1 second. Herein, the designated range may correspond to the designated length of the set one or more sliding windows. For example, when the electronic device determines one or more sliding windows of a length of 1.2 seconds, the electronic device 200 may analyze a user's additional input sound of the length of 1.2 seconds.

In an embodiment, in operation 1160, the electronic device 200 may calculate one or more similarities. In an embodiment, the electronic device 200 may calculate similarities between the user's additional input sound and the respective original sounds corresponding to the determined one or more sliding windows, by using a result of analyzing the set one or more sliding windows and a result of analyzing the user's additional input sound. For example, the electronic device 200 may calculate a first similarity, a second similarity, and a third similarity, respectively, by comparing beat information of the user's additional input sound, and beat information of the first sliding window, beat information of the second sliding window, and beat information of the third sliding window. The number of calculated similarities may correspond to the number of sliding windows.

In an embodiment, in operation 1170, the electronic device 200 may determine whether there exists a similarity greater than or equal to a threshold.

When there does not exist the similarity greater than or equal to the threshold (No in operation 1170), the electronic device 200 determines that a wrong song is determined, and may perform the operation of determining a song again. For example, the electronic device 200 may resume operation 530 of FIG. 5 (or operation 810 of FIG. 8).

When there exists the similarity greater than or equal to the threshold (Yes in operation 1170), the electronic device 200 may determine an output time of the output sound based on the similarity greater than or equal to the threshold in operation 1180. For example, when only the second similarity is greater than or equal to a pre-designated value from among the first to third similarities, the electronic device 200 may determine the output time of the output sound based on the time section of the second sliding window. For example, the electronic device 200 may determine an end point (t=3.1) of the time section (t=2.1~t=3.1) of the second sliding window as an output time of the output sound, or may determine a time which is the end point of the time section of the second sliding window plus a pre-designated time as the output time of the output sound. In another example, the electronic device 200 may determine a sliding window that has the highest similarity from among the first, second, and third similarities as the output time of the output sound.

Figure 12:
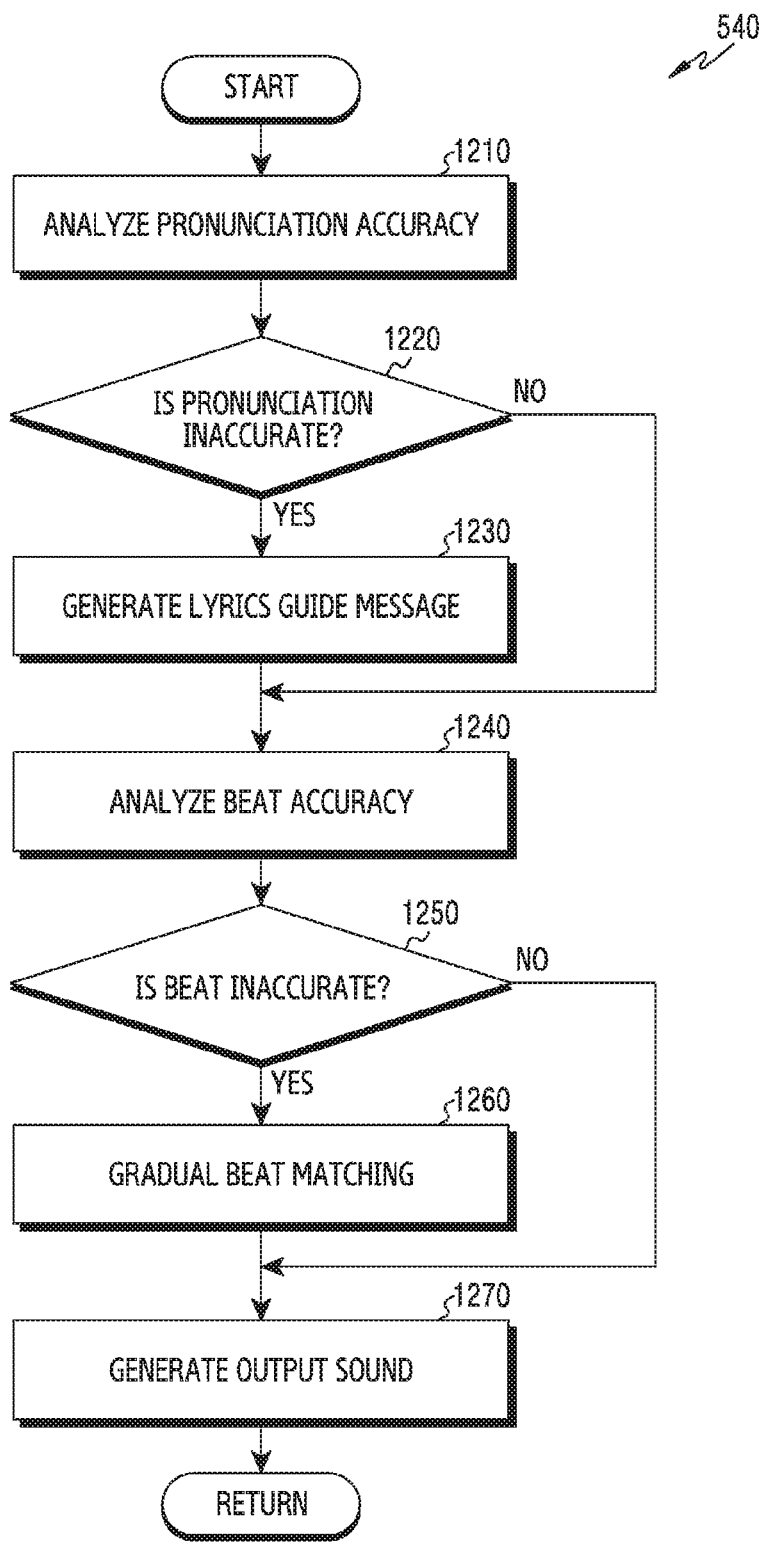
FIG. 12 is a flowchart illustrating a flow of operations performed by an electronic device to generate an output sound according to various embodiments of the disclosure.

FIG. 12 is a flowchart illustrating a flow of operations performed by an electronic device to generate an output sound according to various embodiments of the disclosure.

In an embodiment, the operations disclosed in FIG. 12 may be detailed operations of operation 540 of FIG. 5.

In an embodiment, the operations disclosed in FIG. 2 may be operations for providing feedback or coaching on user's inaccurate pronunciation, beat, or tune in real time. For example, when the electronic device 200 determines one or more play modes including a coaching mode from among the plurality of play modes corresponding to the searched song in operation 830 of FIG. 8, the electronic device 200 may perform the operations disclosed in FIG. 12. Hereinafter, the operations of FIG. 12 will be described on the assumption that the electronic device 200 determines two play modes (coaching mode and instrumental mode) from among the plurality of play modes corresponding to the searched song in operation 840.

In an embodiment, in operation 1210, the electronic device 200 may analyze pronunciation accuracy. The electronic device 200 may analyze the pronunciation accuracy by using lyrics of the song determined in operation 530. For example, the electronic device 200 may determine lyrics that are pronounced by the user by using a module for transforming speech data into text data (for example, an automatic speech recognition (ASR) module), which is included in the electronic device 200 or an external device communicating data with the electronic device 200, and may analyze pronunciation accuracy by comparing the lyrics pronounced by the user and the lyrics of the song determined in operation 530. In another example, the electronic device 200 may determine information regarding user's lips or movement of lips in the image information received from the camera module 260, may determine lyrics pronounced by the user based on the lip information, and may analyze pronunciation accuracy by comparing the lyrics pronounced by the user and the lyrics of the song determined in operation 530.

In an embodiment, when the electronic device 200 outputs an output sound overlapping input of the input sound in analyzing pronunciation accuracy, the electronic device 200 may adjust a frequency of the outputted output sound to distinguish the input sound from the outputted output sound.

In an embodiment, in operation 1220, the electronic device 200 may determine whether lyrics pronounced by the user is inaccurate. For example, the electronic device 200 may determine whether the pronunciation accuracy analyzed in operation 1210 is lower than a threshold.

In an embodiment, when the lyrics pronounced by the user is inaccurate (Yes in operation 1220), the electronic device 200 may generate a lyrics guide message in operation 1230. For example, the electronic device 200 may display accurate lyrics of the song on the display 220, and simultaneously, may highlight a word that the user pronounces wrong.

In an embodiment, in generating the lyrics guide message, user's use history information may be additionally used. For example, the electronic device 200 may generate the lyrics guide message only when the user wrongly pronounces the same part a designated number of times or more.

When the lyrics pronounced by the user is accurate (No in operation 1220), the electronic device may analyze beat accuracy in operation 1240. For example, the electronic device 200 may set a sliding window having a designated length, and may analyze beat accuracy by comparing beat information of the original sound corresponding to the sliding window and beat information of the input sound corresponding to the sliding window.

In analyzing beat accuracy, the electronic device 200 may perform a global sync operation for discovering a start point prior to analyzing beat accuracy although it is not illustrated.

When the beat of the input sound is accurate (No in operation 1250), the electronic device 200 may generate an output sound in operation 1270. For example, the electronic device 200 may not provide a guide message regarding the beat, and may generate the output sound based on play modes (for example, the instrumental mode) except for the coaching mode. For example, the electronic device 200 may generate the output sound to add a sound of a separate instrument to the song associated with the input sound.

When the beat of the input sound is inaccurate (Yes in operation 1250), the electronic device 200 may perform gradual beat matching in operation 1260. In an embodiment, the gradual beat matching may indicate a series of operations of comparing the beat of the original sound corresponding to the sliding window of the designated length, and the beat of the input sound, and repeating the beat comparing operation while adjusting the length of the sliding window according to a result of comparing. In an embodiment, the electronic device 200 may synchronize the beat of the original sound with the beat of the input sound, or may synchronize the beat of the input sound with the beat of the original sound by performing the gradual beat matching.

Although FIG. 12 illustrates only the beat, the embodiment of FIG. 12 is not limited to the beat. For example, a variety of musical feature information that may be analyzed from the input sound, including a tune, a tone, a beat, may be applied to the embodiment of FIG. 12.

In an embodiment, in operation 1270, the electronic device 200 may generate the output sound. For example, the electronic device 200 may generate the output sound based on play modes (for example, the instrumental mode) except for the coaching mode. The electronic device 200 may generate a beat guide message although it is not illustrated. For example, the electronic device 200 may generate a beat guide message indicating that the input sound is a half beat slower than the original sound, and coaching the user to sing the song a half beat fast.

In an embodiment, in generating the output sound, the electronic device 200 may use a result of the gradual beat matching in operation 1260. For example, the electronic device 200 may generate the output sound based on the original sound synchronized with the beat of the input sound.

In another embodiment, the electronic device 200 may generate the output sound regardless of the result of the gradual beat matching in operation 1260. For example, the electronic device 200 may generate the output sound based on the original sound that is not synchronized with the beat of the input sound.

In an embodiment, in generating the output sound, the electronic device 200 may use at least part of context information associated with the input sound. For example, when the user has a history of having sung the song associated with the input sound multiple times, the electronic device 200 may generate the output sound based on the original sound that is not synchronized with the beat of the input sound. In another example, when the user sings the song associated with the input sound for the first time, the electronic device 200 may generate the output sound based on the original sound synchronized with the beat of the input sound.

Figure 13:
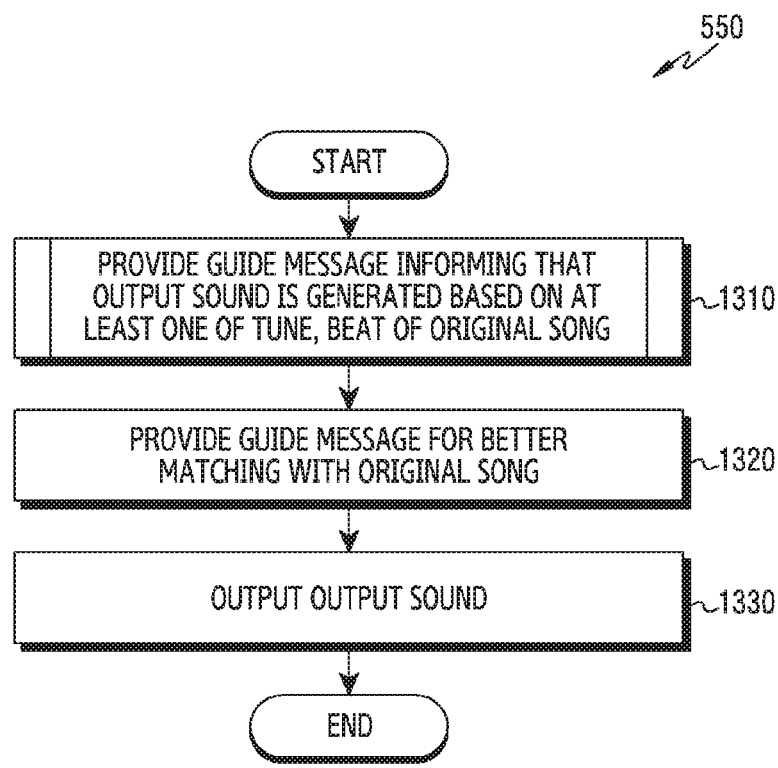
FIG. 13 is a flowchart illustrating a flow of operations performed by an electronic device to output an output sound according to various embodiments of the disclosure.

FIG. 13 is a flowchart illustrating a flow of operations performed by an electronic device to output an output sound according to various embodiments of the disclosure.

In an embodiment, the operations disclosed in FIG. 13 may be detailed operations of operation 550 of FIG. 5.

In an embodiment, the operations disclosed in FIG. 13 may be operations for providing feedback or coaching on user's inaccurate pronunciation, beat, or tune in real time.

For example, the electronic device 200 may perform the operations disclosed in FIG. 13 when one or more play modes including the coaching mode are determined from among the plurality of play modes corresponding to the searched song in operation 840 of FIG. 8.

In an embodiment, in operation 1310, the electronic device 200 may provide a guide message informing that the output sound is generated based on at least one of a tune, a beat of the original song. For example, when a beat corresponding to the input sound is a half beat slower than the beat of the original sound, the electronic device 200 may provide a guide message informing that the output sound is generated based on the beat of the original song. In addition, the electronic device 200 may provide a guide message indicating that the input sound is a half beat slower than the original sound, and coaching the user to sing the song a half beat fast.

When the lyrics guide message is generated in operation 1230 of FIG. 12, the electronic device 200 may provide the generated lyrics guide message to the user although it is not illustrated. For example, the electronic device 200 may highlight a portion that the user wrongly sings in the repeated chorus and may provide the highlighted portion to the user.

In an embodiment, in operation 1320, the electronic device 200 may provide a guide message for better matching with the original song. For example, the electronic device 200 may provide a beat guide message indicating that the input sound is a half beat slower than the original sound, and coaching the user to sing the song a half beat fast.

In an embodiment, in operation 1330, the electronic device 200 may output the output sound. For example, the electronic device 200 may output the output sound generated in operation 540 through the speaker 240.

In operation 1310, the electronic device 200 may provide a guide message informing that the output sound is generated based on at least one of the tune, the beat of the input sound although it is not illustrated.

Figures 14A, 14B:
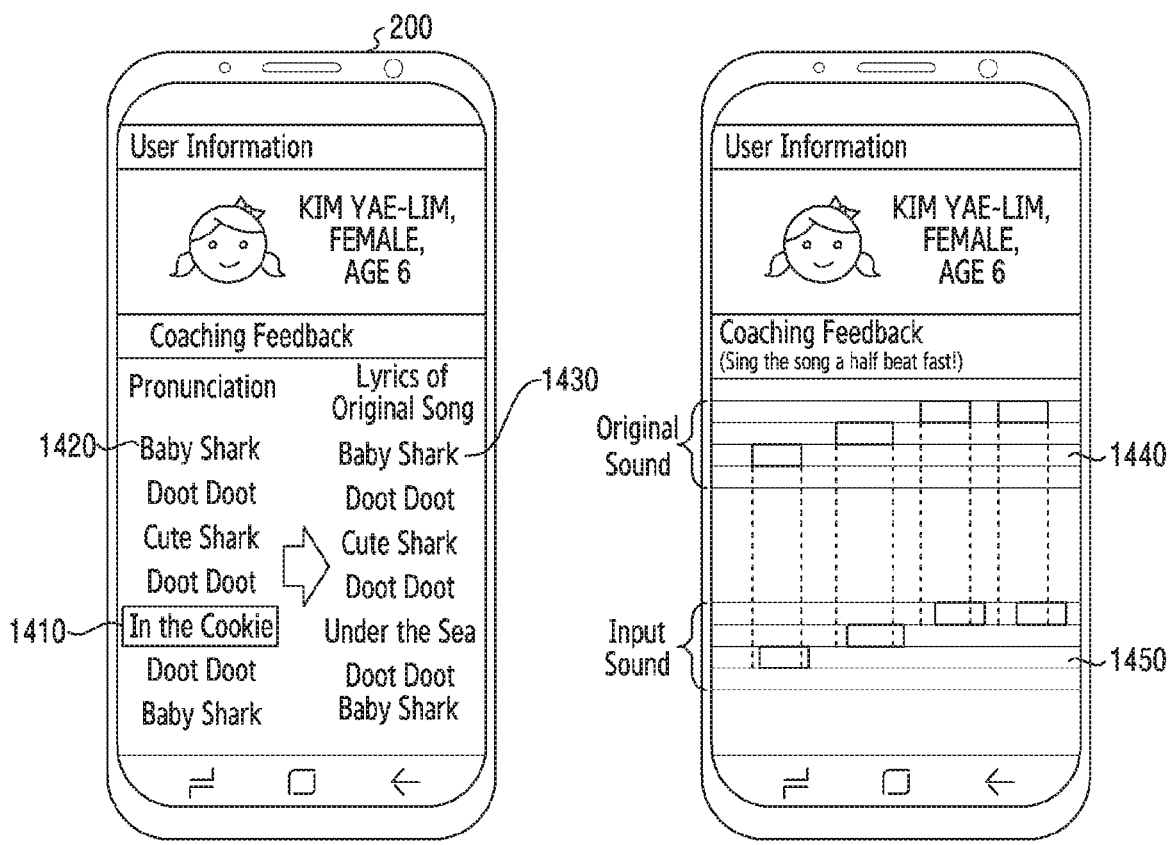
FIG. 14A is a view illustrating an example of feedback provided to a user according to various embodiments of the disclosure.
FIG. 14B is a view illustrating an example of feedback provided to a user according to various embodiments of the disclosure.

FIG. 14A is a view illustrating an example of feedback provided to a user according to various embodiments of the disclosure, and FIG. 14B is a view illustrating an example of feedback provided to the user according to various embodiments of the disclosure.

Referring to FIG. 14A, an electronic device (for example, the electronic device 200) may provide a guide message regarding lyrics. For example, the electronic device 200 may display original lyrics 1430 of a song associated with an input sound on a display (for example, the display 220), and simultaneously, may display lyrics 1420 which are pronounced by the user, and may highlight a word 1410 that the user pronounces wrong in the lyrics 1420 pronounced by the user.

Referring to FIG. 14B, the electronic device 200 may provide a guide message regarding a beat.

Referring to FIG. 14B, the electronic device 200 may generate the output sound based on the beat of the input sound or the beat of the original sound. In two cases, the electronic device 200 may provide a beat guide message indicating that the input sound 1450 is a half beat slower than the original sound 1440, and coaching the user to sing the song a half beat fast.

Figure 15:
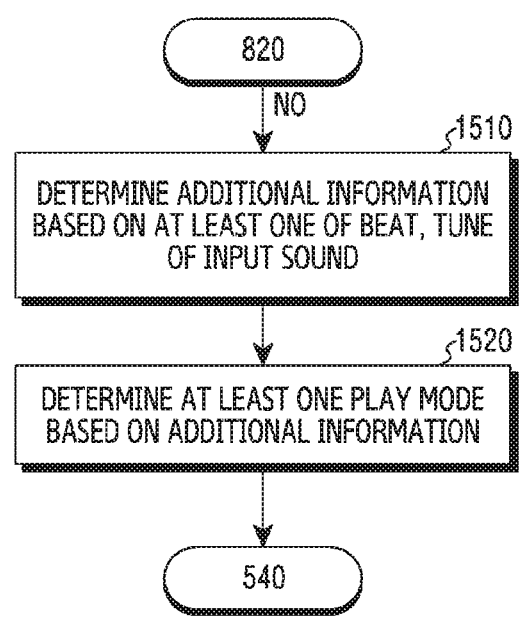
FIG. 15 is a flowchart illustrating a flow of operations performed by an electronic device when a song related to an input sound is not determined according to various embodiments of the disclosure.

FIG. 15 is a flowchart illustrating a flow of operations performed by an electronic device when a song associated with an input sound is not determined according to various embodiments of the disclosure.

In an embodiment, when the song associated with the input sound is not searched (No in operation 820 of FIG. 8), the electronic device 200 may output an error message as described above.

In another embodiment, the electronic device 200 may determine additional information based on at least one of a beat, a tune, lyrics of the input sound in operation 1510, instead of outputting the error message. The additional information may refer to information related to the input sound that may be extracted by the electronic device 200 by using at least one of the beat, tune, and lyrics of the input sound. For example, the additional information may be at least one of a genre, a tempo, or BPM of the input sound, and a combination of predetermined words. For example, the electronic device 200 may determine the genre of the input sound to jazz, based on the beat of the input sound. In another example, the electronic device 200 may determine that the input sound is associated with a combination of predetermined words (for example, Tiger Roar), based on the lyrics of the input sound.

In an embodiment, in operation 1520, the electronic device 200 may determine at least one play mode based on the determined additional information. For example, the electronic device 200 may determine at least one play mode (for example, the instrumental mode) based on genre information (for example, jazz) of the input sound. This is because a musical instrument (for example, a trumpet) sound mainly used for the jazz genre may be provided as background music. In another example, the electronic device 200 may determine at least one play mode (for example, the sound effect mode) based on a determination that the input sound is associated with the combination of the predetermined words.

In an embodiment, the electronic device 200 may proceed to operation 540. The electronic device 200 may generate an output sound based on the at least one play mode determined in operation 1520.

For example, when the instrumental mode is determined based on the genre information (for example, jazz) of the input sound, the electronic device 200 may generate a trumpet sound based on the beat of the input sound.

In another example, when the input sound is associated with the combination of the predetermined words and the sound effect mode is determined, the electronic device 200 may generate an output sound including a sound effect indicating a crying sound of the tiger when the same combination of words is inputted within a designated time.

When a song associated with the input sound is additionally searched, the electronic device 200 may perform a sing along function.

A computer-readable recording medium may include a hard disk, a floppy disk, magnetic media (for example, a magnetic tape), optical media (for example, compact disc read only memory (CD-ROM) and a digital versatile disc (DVD), magneto-optical media (for example, a floptical disk)), or an internal memory. Also, an instruction may include a code generated by a compiler or a code executable by an interpreter. A module or program module according to various embodiments may include one or more of the above-described elements, some element may be omitted, or other element(s) may further be included. According to various embodiments, operations performed by the module, the program, or another component may be carried out sequentially, in parallel, repeatedly, or heuristically, or one or more of the operations may be executed in a different order or omitted, or one or more other operations may be added.

In addition, the embodiments disclosed in the disclosure and the drawings are suggested for easy explanation and understanding of the disclosed technical features, and are not intended to limit the scope of the disclosure. Therefore, the scope of the disclosure should be interpreted as including all changes or modified forms derived based on the technical idea of the disclosure, in addition to the embodiments disclosed herein.

The electronic device according to various embodiments of the disclosure can provide rich music experiences to a user by playing a background sound or a sound effect based on an input sound, user's preference, or context when the user is singing a song or playing an instrument.

The electronic device can provide a learning effect to the user by providing feedback on a part where the user sings wrong or plays an instrument wrong when the user is singing a song or playing the instrument.

Although the present disclosure has been described with various embodiments, various changes and modifications may be suggested to one skilled in the art. It is intended that the present disclosure encompass such changes and modifications as fall within the scope of the appended claims.

What is claimed is:
1. An electronic device comprising:
 a microphone;
 a speaker;
 a processor operatively connected to the microphone and the speaker; and
 a memory electrically connected to the processor and storing instructions that, when executed by the processor, cause the processor to:
  receive a sound through the microphone,
  analyze the received sound,
  determine a song associated with the sound and a kind of output sound based on a result of the analyzing,
  analyze an accuracy of at least one of musical feature information of the received sound or text information associated with the received sound based on the received sound an original sound of the song associated with the received sound, and
  based on the analyzed accuracy being less than or equal to a threshold, generate a guide message for better matching with the original sound of the song associated with the received sound, provide the guide message through one or more of a display or the speaker,
generate an output sound based on the kind of output sound, and
output the generated output sound through the speaker,
wherein the kind of output sound comprises a play mode of a plurality of play modes of the determined song.

2. The electronic device of claim 1, wherein the kind of output sound comprises at least one of a humming version of the song, a version including lyrics, an instrumental version, or a sound effect version.

3. The electronic device of claim 1, wherein the memory stores instructions that, when executed by the processor, cause the processor to analyze the received sound based on at least one of an intensity, a tone, a pitch, or a spectrum of the received sound.

4. The electronic device of claim 1, wherein:
the memory stores information regarding at least one song, and
the memory stores instructions that, when executed by the processor, cause the processor to:
determine the song associated with the sound based on the result of the analyzing the received sound and the stored song information;
determine feature information of music styles corresponding to a plurality of output sounds based on the determined song; and
determine the kind of output sound by determining the kind of output sound from among kinds of the plurality of output sounds based on the result of the analyzing the received sound and the determined feature information.

5. The electronic device of claim 1, wherein:
the memory stores instructions that, when executed by the processor, cause the processor to obtain context information related to the received sound, and
the context information comprises at least one of information of a time at which the sound is received, place information, weather information, emotion information of a user who generates the sound, or use history information.

6. The electronic device of claim 5, further comprising a camera module,
wherein at least part of the context information is obtained based on image information captured by the camera module.

7. The electronic device of claim 5, wherein, to generate the output sound, the memory stores instructions that, when executed by the processor, cause the processor to:
synchronize the received sound with the original sound of the song associated with the received sound, and transfer a style of the synchronized original sound based on the determined kind of output sound.

8. The electronic device of claim 7, wherein, to synchronize the received sound with the original sound of the song associated with the received sound, the memory stores instructions that, when executed by the processor, cause the processor to:
determine a point of time within the original sound that corresponds to a start point of time of the received sound or a time section within the original sound that corresponds to a time section of the received sound;
set a window comprising a designated length after the determined point of time or within the determined time section;
compare the musical feature information of the received sound within the set window and the musical feature information that is previously predicted and stored in the memory; and
synchronize the original sound with the received sound based on a result of the comparison.

9. The electronic device of claim 7, wherein, to transfer the style of the synchronized original sound, the memory stores instructions that, when executed by the processor, cause the processor to input one or more of at least one parameter associated with the determined kind of output sound or at least one parameter associated with the context information into a model for generating a sound.

10. An operating method of an electronic device, the method comprising:
receiving a sound;
analyzing the received sound;
determining a song associated with the sound and a kind of output sound based on a result of the analyzing;
analyzing accuracy of at least one of musical feature information of the received sound or text information associated with the received sound based on the received sound and an original sound of the song associated with the received sound; and
based on the analyzed accuracy being less than or equal to a threshold, generating a guide message for better matching with the original sound of the song associated with the received sound;
providing the guide message through one or more of a display or a speaker of the electronic device;
generating an output sound based on the determined kind of output sound; and
outputting the generated output sound,
wherein the kind of output sound comprises a play mode of a plurality of play modes of the determined song.

11. The method of claim 10, wherein the determined kind of output sound comprises at least one of a humming version of the song, a version including lyrics, an instrumental version, or a sound effect version.

12. The method of claim 10, wherein analyzing the received sound comprises analyzing the received sound based on at least one of an intensity, a tone, a pitch, or a spectrum of the received sound.

13. The method of claim 10, wherein determining the song associated with the sound and the kind of output sound comprises:
determining the song associated with the sound based on the result of the analyzing the received sound and song information that is stored in a memory of the electronic device;
determining feature information of music styles corresponding to a plurality of output sounds based on the determined song; and
determining the kind of output sound from among kinds of the plurality of output sounds based on the result of the analyzing the received sound and the determined feature information.

14. The method of claim 10, further comprising obtaining context information related to the received sound,
wherein the context information comprises at least one of information of a time at which the sound is received, place information, weather information, emotion information of a user who generates the sound, or use history information.

15. The method of claim 14, wherein at least part of the context information is obtained based on image information captured by a camera module of the electronic device.

16. The method of claim 14, wherein generating the output sound comprises:
- synchronizing the received sound with the original sound of the song associated with the received sound; and
- transferring a style of the synchronized original sound based on the determined kind of output sound.

17. The method of claim 16, wherein synchronizing the received sound with the original sound of the song associated with the received sound comprises:
- determining a point of time within the original sound that corresponds to a start point of time of the received sound or a time section within the original sound that corresponds to a time section of the received sound;
- setting a window comprising a designated length after the determined point of time or within the determined time section;
- comparing the musical feature information of the received sound within the set window and the musical feature information that is previously predicted and stored in a memory; and
- synchronizing the original sound with the received sound based on a result of the comparison.

18. The method of claim 16, wherein transferring the style of the synchronized original sound based on the determined kind of output sound comprises inputting one or more of: at least one parameter associated with the determined kind of output sound or at least one parameter associated with the context information into a model for generating a sound.

\* \* \* \* \*